United States Patent
Deguchi et al.

(10) Patent No.: US 9,154,020 B2
(45) Date of Patent: Oct. 6, 2015

(54) AXIAL GAP ROTATING-ELECTRIC MACHINE

(71) Applicant: Hitachi, Ltd., Chiyoda-ku, Tokyo (JP)

(72) Inventors: Kenta Deguchi, Hitachinaka (JP);
Hirooki Tokoi, Tokai-mura (JP);
Zhuonan Wang, Frankfurt (DE);
Norihisa Iwasaki, Hitachinaka (JP);
Yuji Enomoto, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 302 days.

(21) Appl. No.: 13/935,073

(22) Filed: Jul. 3, 2013

(65) Prior Publication Data
US 2014/0009009 A1 Jan. 9, 2014

(30) Foreign Application Priority Data
Jul. 6, 2012 (JP) .................. 2012-152091

(51) Int. Cl.
| | |
|---|---|
| H02K 1/22 | (2006.01) |
| H02K 11/00 | (2006.01) |
| H02K 1/18 | (2006.01) |
| H02K 9/22 | (2006.01) |
| H02K 21/24 | (2006.01) |
| H02K 5/08 | (2006.01) |

(52) U.S. Cl.
CPC ............ *H02K 11/0089* (2013.01); *H02K 1/182* (2013.01); *H02K 9/22* (2013.01); *H02K 5/08* (2013.01); *H02K 21/24* (2013.01)

(58) Field of Classification Search
CPC ..... H02K 11/0089; H02K 9/22; H02K 21/24; H02K 21/12
USPC .................... 310/266, 267, 268, 43
See application file for complete search history.

(56) References Cited

U.S. PATENT DOCUMENTS

| | | | | |
|---|---|---|---|---|
| 4,220,879 | A | * 9/1980 | Hoshimi et al. ............ | 310/68 R |
| 4,577,130 | A | * 3/1986 | Reed .............................. | 310/194 |
| 5,510,664 | A | * 4/1996 | Suzuki et al. ................. | 310/268 |
| 2005/0194855 | A1 | 9/2005 | Hasebe et al. | |

FOREIGN PATENT DOCUMENTS

| | | |
|---|---|---|
| JP | 2005-269778 A | 9/2005 |
| JP | 2009-118628 A | 5/2009 |

* cited by examiner

*Primary Examiner* — Hanh Nguyen
(74) *Attorney, Agent, or Firm* — Crowell & Moring LLP

(57) ABSTRACT

An axial gap rotating-electric machine includes a stator, a rotor arranged via an air gap in the direction of an axis of rotation of a rotating-electric machine with respect to the stator, and a housing configured to accommodate the stator and the rotor, and the stator includes a plurality of stator cores arranged in the circumferential direction, coils configured to wind the peripheries of the respective stator cores, and a resin for molding the plurality of stator cores wound with the coils, and the stator cores each include a protruding portion protruding partly from the coil in the direction of axis of rotation, and a conductive member is provided so as to come into contact with peripheral surfaces of the protruding portions of the stator cores, and grounding is achieved by the conductive member.

18 Claims, 8 Drawing Sheets

AXIAL GAP ROTATING-ELECTRIC MACHINE

CLAIM OF PRIORITY

The present application claims priority from Japanese Patent application serial No. 2012-152091, filed on Jul. 6, 2012, the content of which is hereby incorporated by reference into this application.

TECHNICAL FIELD

The present invention relates to an axial gap rotating-electric machine and, more specifically, to an earth structure of a stator core of an axial gap rotating-electric machine in which a stator is held by a mold resin.

BACKGROUND ART

Axial gap rotating-electric machines include a two-rotor one-stator axial gap rotating-electric machine having a structure including a pair of disk-shaped rotors arranged in the direction of the rotating shaft of the rotating-electric machine so as to face each other, and a stator interposed between the pair of rotors with a predetermined gap therebetween. The rotor includes a rotor core and one or a plurality of magnets arranged in the circumferential direction, and the stator includes a plurality of stator cores arranged in the circumferential direction and coils wound around the stator cores. The axial gap rotating-electric machine in this configuration is described for example in JP-A-2005-269778 as well.

In contrast, when the stator is held by a mold resin, a problem of electrical corrosion of the bearing arises. In other words, since the stator core is electrically insulated by the mold resin and is at a floating potential, a voltage is generated between the stator and the rotor due to the electrostatic capacity between the rotor and the stator. When this voltage is higher than the discharge starting voltage of an oil film of the bearing, electric discharge occurs in the bearing, and hence the service life of the bearing is shortened. As a countermeasure of the electrical corrosion of the bearing, a method of grounding the stator core is known (JP-A-2009-118628, for example).

SUMMARY OF INVENTION

Technical Problem

A stator described in JP-A-2005-269778 includes sectorial iron cores (stator cores) when viewed in the axial direction each wound with a coil and arranged in the circumferential direction by the same number as the desired number of poles and form an annular shape as a whole, and is configured to be supported by being mounted on a case via a plate-shaped supporting member. Therefore, even when the stator cores are molded by a resin, the stator cores may be grounded via a case by forming the plate-shaped supporting member of a conductive material.

However, in the case of the two-rotor one-stator axial gap rotating-electric machine described in JP-A-2005-269778, since the coils are divided by the plate-shaped supporting member into two parts on both sides of the plate-shaped supporting member, coil connection becomes complex, and increase in number of components associated with the connection and increase in number of process steps may result.

JP-A-2009-118628 discloses a method of grounding stator cores by fixing iron core connecting terminals to outer peripheral portions of the stator cores, bringing the iron core connecting terminal into contact with an electric conductive layer provided on a motor frame to bring the stator core and the electric conductive layer of the motor frame into electric continuity in a radial gap mold motor. However, a grounding method described in JP-A-2009-118628 cannot be applied to axial gap rotating-electric machines (especially, two-rotor one-stator axial gap rotating-electric machines). In other words, if the stator core of the axial gap rotating-electric machine does not have the divided structure as described in JP-A-2005-269778, since the coil is wound around the entire circumference, the iron core connecting terminal cannot be provided on the outer peripheral portion of the stator core.

When the stator core and the iron core connecting terminal are brought into contact on a gap surface where the stator core is exposed, there arise problems that a magnetic flux generated from the coil may act on the iron core connecting terminal and may cause a loss, or the length of the gap may be increased by the iron core connecting terminal being inserted.

Furthermore, in the axial gap rotating-electric machine in which a plurality of the stator cores are arranged in the circumferential direction, in order to ground the plurality of stator cores arranged in the circumferential direction, the number of components increases and hence the structure is complicated and, increase in manufacturing process steps and increase in cost may result.

It is an object of the invention to realize grounding of stator cores in an axial gap rotating-electric machine in which a stator is held by a mold resin without complicating the structure.

Solution to Problem

The invention provides an axial gap rotating-electric machine characterized in that a stator is configured so that parts of stator cores protrude in the axial direction (in the direction of the axis of rotation of the rotating-electric machine) from coils wound around the stator core, and the peripheral surfaces of the protruded portions (protruding portions) of the stator cores and a housing of the rotating-electric machine are electrically connected by a conductive member.

Advantageous Effects of Invention

According to the invention, the stator core may be grounded without complicating the structure.

The subject, the configuration, and the effects other than those described above will be apparent from the description of the embodiments given below.

DESCRIPTION OF EMBODIMENTS

Examples of the invention will be described below. In the following description, a case where the invention is applied to a two-rotor one-stator axial gap motor is applied as an example of an axial gap rotating-electric machine will be described. Since the two-rotor one-stator axial gap rotating-electric machine includes two rotors, a larger amount of magnetic flux may be used in comparison with a one-rotor axial gap rotating-electric machine. Therefore, the two-rotor one-stator axial gap rotating-electric machine is advantageous in terms of efficiency improvement and increase in output density.

First of all, the two-rotor one-stator axial gap motor to which the invention is applied will be described with reference to FIGS. 1A to 1C.

Figure 1A:
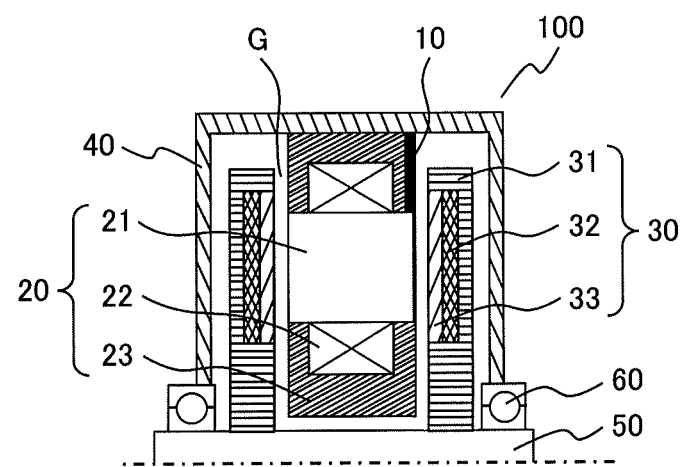
FIG. 1A is a cross-sectional view of an axial gap motor according to Example 1 of the invention.
Figure 1B:
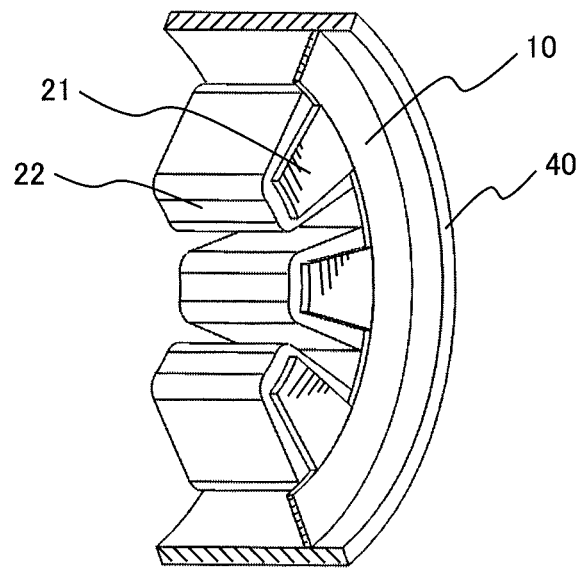
FIG. 1B is a perspective view illustrating a configuration of a stator of the axial gap motor of Example 1 of the invention.
Figure 1C:
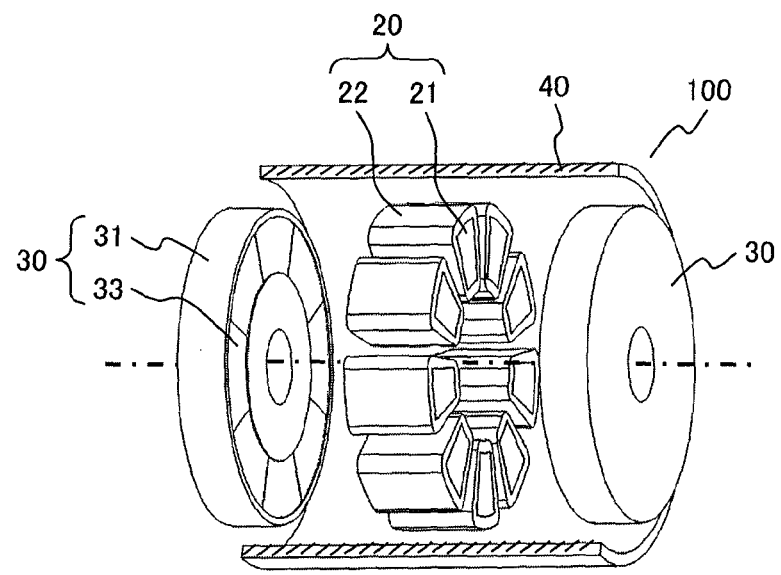
FIG. 1C is a perspective view illustrating an example of a structure of a two-rotor one-stator axial gap rotating-electric machine to which the example of the invention is applied.

FIG. 1A is a cross-sectional view illustrating a two-rotor one-stator axial gap motor as an example of the invention, FIG. 1B is a perspective view illustrating a configuration of a stator of the axial gap motor of the example of the invention, and FIG. 1C is a partial perspective view of the axial gap motor to which the invention is applied.

<Motor Structure>

As illustrated in FIG. 1A, a two-rotor one-stator axial gap motor 100 includes a pair of disk-shaped rotors 30 arranged so as to face each other in the direction of an axis of rotation and a stator 20 interposed between a pair of the rotors 30 via a predetermined gap G. The rotors 30 are mounted on a rotating shaft 50, and the stator 20 is supported by a metallic housing 40 via a mold resin 23. The housing 40 is arranged so as to cover the rotors 30 and the stator 20, and supports the rotating shaft 50 via a bearing 60.

<Rotor>

The rotors 30 include one or a plurality of magnets 33 arranged in the circumferential direction and a rotor core 32 both held by a structural member 31. In the invention, the rotors 30 are not limited to the structure illustrated in FIG. 1A and FIG. 1C, and the detailed shape may be arbitrary. For example, a radially outer peripheral end portion of the structural member may be omitted to reduce a leak magnetic flux.

<Stator>

The stator 20 includes a plurality of stator cores 21 arranged in the circumferential direction and coils 22 wound around the respective stator cores 21, is integrated by the mold resin 23, and is held by the housing 40 via the mold resin 23. The stator cores 21 are molded by the mold resin 23, and hence are electrically independent and insulated. Therefore, the stator cores 21 have a floating potential and hence a potential difference is generated between the stator and the rotor if the earth is not provided. Then, since an axial voltage is generated in the bearing 60 and a bearing current flows therethrough, electrical corrosion of the bearing may result. Therefore, an earth structure of the stator cores configured to prevent the stator cores 21 from having the floating potential is provided.

In the respective examples of the invention, the earth structure of the stator cores is provided while minimizing the increase in number of components and avoiding complication of the structure.

Example 1

Figure 13:
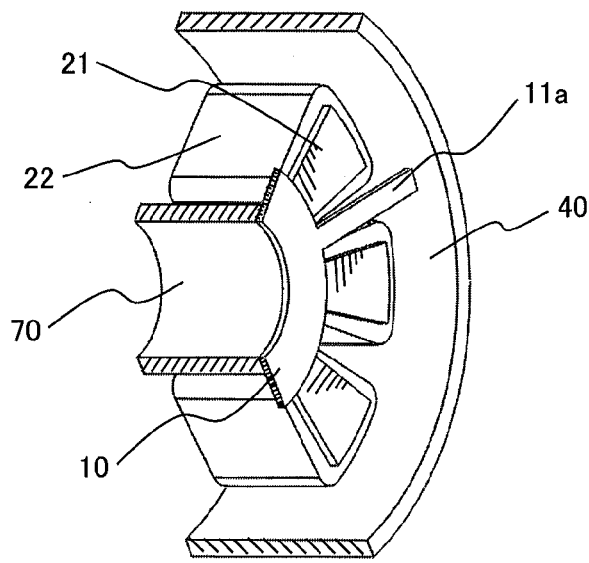
FIG. 13 is a perspective view illustrating an example of a grounding structure of the cylindrical conductive member of Example 11 of the invention.

FIG. 1A is a cross-sectional view illustrating an example of the two-rotor one-stator axial gap motor as Example 1. FIG. 13 is a perspective view of the stator 20 of FIG. 1A. In FIG. 1B, illustration of the mold resin 23 is omitted.

In Example 1, the stator is configured so that the stator cores 21 partly protrude in the axial direction (the direction of the axis of rotation of the motor) from the coils 22. A ring-shaped non-magnetic or paramagnetic conductive member 10 is arranged between the outer peripheral surfaces of the protruding portions of the stator cores 21 and the inner peripheral surface of the housing 40. For example, aluminum alloy is used as a non-magnetic conductive member. Although a magnetic material may be used as the conductive member, a non-magnetic conductive member is preferably used for allowing the magnetic field to pass effectively through the stator cores.

The inner peripheral surface of the link-shaped conductive member 10 comes into contact with the outer peripheral surfaces of all of the protruding portions of a plurality of the stator cores 21 arranged in the circumferential direction, and the outer peripheral surface of the ring-shaped conductive member 10 comes into contact with the inner peripheral surface of the housing 40, and electrically connects the outer peripheral surfaces of the protruding portions of the stator cores and the inner peripheral surface of the housing. The conductive member is integrated with the stator with a mold resin and is fixed to the housing.

In Example 1, a plurality of the stator cores 21 and the housing 40 are in electrical continuity via one ring-shaped conductive member 10. Therefore, the stator cores 21 are grounded to the housing 40, and hence the stator cores 21 are prevented from having the floating potential. In Example 1, the grounding of the respective stator cores may be achieved via the single ring-shaped conductive member 10 without providing connecting terminals on end surfaces of the respective stator cores. Therefore, a plurality of the stator cores arranged on the stator may be grounded with a minimum number of components without complicating the structure.

In Example 1, the conductive member 10 acts as a thermal radiating channel between the stator 20 and the housing 40, a temperature rise of the stator 20 may be restrained.

Furthermore, in Example 1, since the inner peripheral surface of the conductive member 10 comes into contact with the outer peripheral surfaces of all the protruding portions of a plurality of the stator cores 21, positional accuracy of the stator cores 21 in the radial direction is improved. The positional accuracy may further be enhanced by forming the ring-shaped conductive member 10 concentrically with the rotating shaft 50 of the motor. The ring-shaped conductive member 10 does not necessarily have to be formed into a circular shape, and the inner peripheral surface and the outer peripheral surface may have a polygonal shape as long as the contact between the stator core and the housing is secured.

In Example 1, the housing is formed of a conductive material (metal) and the grounding is achieved via the housing. Although the number of components is increased, it is also possible to attach an earth cable to the ring-shaped conductive member to achieve the grounding via the earth cable. In this case, the housing does not have to be formed of metal.

Example 2

Figure 2:
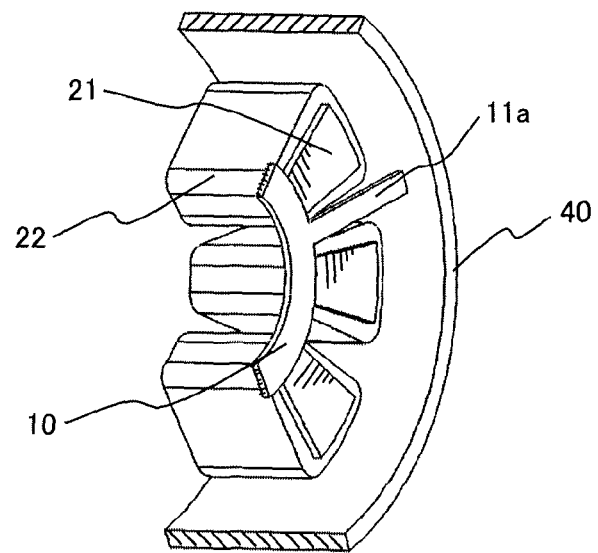
FIG. 2 is a perspective view illustrating a configuration of a stator of the axial gap motor of Example 2 of the invention.

FIG. 2 is a drawing illustrating a structure of a stator of the two-rotor one-stator axial gap motor as Example 2. The same portions as Example 1 are denoted by the same reference numerals, and the description thereof is omitted.

In Example 2, the ring-shaped non-magnetic conductive member 10 is arranged on the inner peripheral sides of the stator cores 21. The outer peripheral surface of the link-shaped conductive member 10 comes into contact with the inner peripheral surfaces of all of the protruding portions of a plurality of the stator cores 21 arranged in the circumferential direction. Furthermore, at least one projecting portion 11*a* extending in the radial direction is provided on the outer peripheral surface (the outer peripheral side) of the ring-shaped conductive member 10 and a distal end of the projecting portion 11*a* comes into contact with the inner peripheral surface of the housing 40. In other words, the plurality of the stator cores 21 come into contact with the conductive member 10 on the inner peripheral side of the protruding portion, and the projecting portion 11*a* of the conductive member 10 comes into contact with the inner peripheral surface of the housing 40 to electrically connect the inner peripheral surfaces of the protruding portions of the stator cores and the inner peripheral surface of the housing.

In Example 2 as well, the stator cores and the housing are in electrical continuity by the conductive member, and the stator cores are grounded to the housing, so that the stator cores are restricted from having the floating potential. In Example 2 as well, the grounding of the respective stator cores may be achieved via the single ring-shaped conductive member 10 without providing connecting terminals on the end surfaces of the respective stator cores. Therefore, a plurality of the stator cores arranged on the stator may be grounded with a minimum number of components without complicating the structure.

In Example 2, with the provision of the conductive member 10 on the inner peripheral sides of the stator cores 21, the amount of the material used for the conductive member 10 may be reduced in comparison with the configuration of Example 1.

In Example 2, although the effect is less than that of Example 1, the conductive member 10 acts as a thermal radiating channel between the stator 20 and the housing 40, a temperature rise of the stator 20 may be restrained in the same manner as Example 1.

Furthermore, in Example 2, since the outer peripheral surface of the conductive member 10 comes into contact with the inner peripheral surfaces of all the protruding portions of a plurality of the stator cores 21, positional accuracy of the stator cores 21 in the radial direction is improved in the same manner as Example 1.

In the same manner as Example 1, it is also possible to attach the earth cable to the projecting portion 11*a* of the ring-shaped conductive member to achieve the grounding via the earth cable.

Example 3

Figure 3:
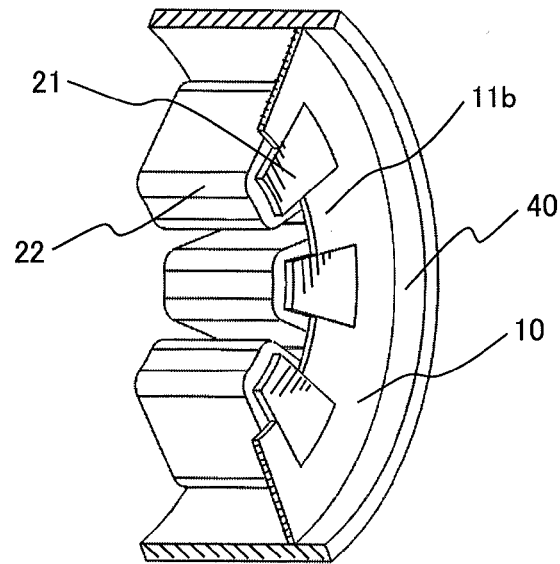
FIG. 3 is a perspective view illustrating a configuration of a stator of the axial gap motor of Example 3 of the invention.

FIG. 3 is a drawing illustrating a structure of a stator of the two-rotor one-stator axial gap motor as Example 3. The same portions as Example 1 are denoted by the same reference numerals, and the description thereof is omitted.

In Example 3, a plurality of the projecting portions 11*b* are provided on the inner peripheral side of the conductive member of Example 1. The respective projecting portions 11*b* come into contact with the side surface of the protruding portions of the stator cores 21 between the protruding portions of the stator cores 21.

In Example 3 as well, the same effect as Example 1 is obtained. In particular, in Example 3, a plurality of the stator cores 21 come into contact with the conductive member 10 (the projecting portions 11*b*) also on the side surfaces of the protruding portions in addition to the outer peripheral surfaces of the protruding portions, and hence the contact properties between the stator cores 21 and the conductive member 10 may be improved.

In Example 3, since the stator cores 21 come into contact with the conductive member 10 on both of the outer peripheral surface and the side surfaces of the protruding portions, the positional accuracies in the radial direction and the circumferential direction of the stator cores 21 are improved.

Furthermore, in Example 3, with the provision of the projecting portions 11*b* to the inner peripheral surfaces of the stator cores 21, the side surfaces of the protruding portions of the stator cores and the projecting portions 11*b* come into contact with each other even when the stator cores 21 are a laminated member insulated in the radial direction, the stator cores 21 may be grounded.

In Example 3, the projecting portions 11*b* are arranged on the inner peripheral side of the conductive member 10. However, the projecting portions extending from the outer peripheral side of the conductive member 10 may be arranged. In other words, in Example 2 described above, a configuration having a plurality of the projecting portions 11*a* and the side surfaces of the protruding portions of the stator cores and the respective projecting portions 11*a* are brought into contact with each other is also applicable. With this configuration, the similar effect as Example 3 is obtained.

In Example 3, an example in which the projecting portions 11*b* are provided all spaces between the protruding portions of the stator cores 21 is described. However, the projecting portions 11*b* may be provided on alternate spaces. The same is applied in a case where the plurality of projecting portions 11*a* are arranged on the outer peripheral side of the conductive member 10.

In Example 3, the outer peripheral surfaces of the stator core are configured to come into contact with the conductive member. However, coming into contact therewith is not always necessary in terms of grounding.

A modification described in conjunction with Example 1 (such as earth cable) may be applied to Example 3 in the same manner.

Example 4

Figure 4:
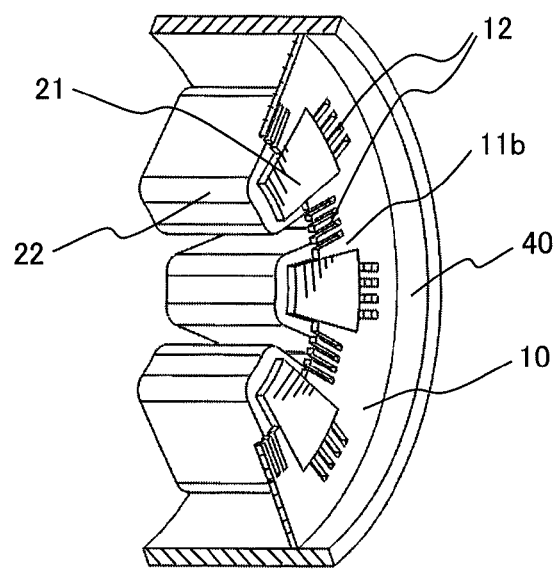
FIG. 4 is a perspective view illustrating a configuration of a stator of the axial gap motor of Example 4 of the invention.

FIG. 4 is a drawing illustrating a structure of a stator of the two-rotor one-stator axial gap motor as Example 4. The same portions as Example 3 are denoted by the same reference numerals, and the description thereof is omitted.

In Example 4, the projecting portions 11b of the conductive member 10 in Example 3 are provided with radial slits 12. Portions where the conductive member 10 and the outer peripheral surfaces of the protruding portions of the stator cores 21 come into contact with are also formed with the radial slit 12.

In Example 4 as well, the same effects as Example 1 and Example 3 are obtained. According to Example 4, since an eddy current path generated in the conductive member 10 may be interrupted by the formation of the radial slits 12 in the projecting portions 11b and the contact portions of the conductive member 10 with respect to the outer peripheral surface of the protruding portions of the stator cores 21, the loss generated in the conductive member 10 may be reduced in comparison with the configuration of Example 3.

The width, the length, the number, and the shape of the slit 12 may be determined as needed from a relationship between an effect of reducing the loss generated in the conductive member 10 and an effect of retraining the temperature rise of the stator 20.

Example 4 may be added not only to the configuration of Example 3, but also to the configurations to Example 1 and Example 2.

A modification described in conjunction with Example 1 or 3 (such as earth cable) may be applied to Example 4 in the same manner.

Example 5

Figure 5A:
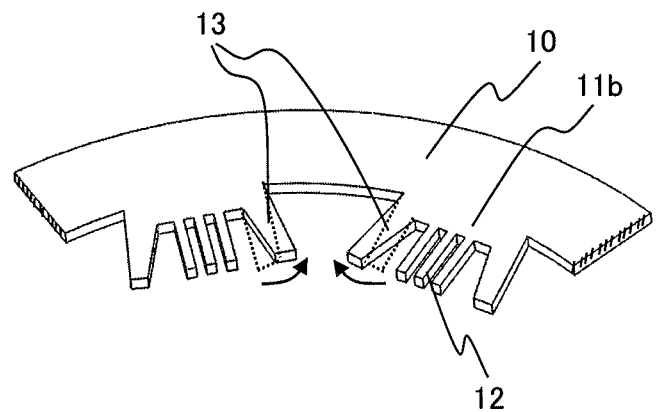
FIG. 5A is a perspective view illustrating a structure of a conductive member of Example 5 of the invention.
Figure 5B:
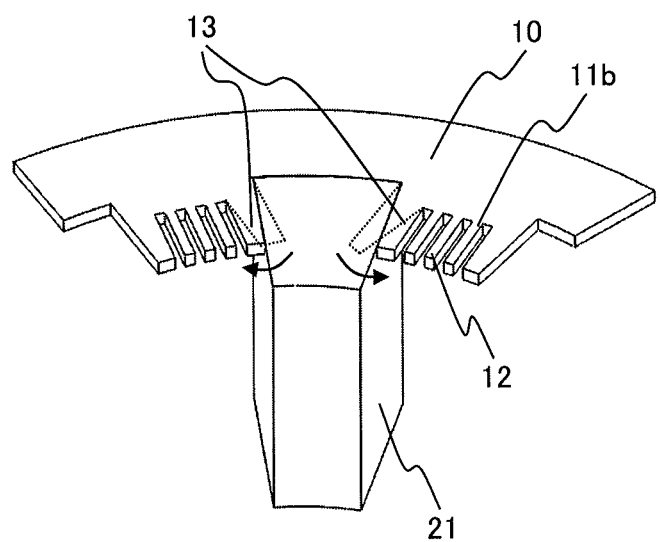
FIG. 5B is a perspective view illustrating a structure of the conductive member and a stator core of Example 5 of the invention.

FIGS. 5A and 5B are drawings illustrating a structure of a stator of the two-rotor one-stator axial gap motor as Example 5. The same portions as Example 4 are denoted by the same reference numerals, and the description thereof is omitted.

In Example 5, as illustrated in FIG. 5A, contact portions 13 of the projecting portions 11b of the conductive member 10 formed with the slit 12 with respect to the side surfaces of the protruding portions of the stator cores 21 are deformed in the circumferential direction so as to position on the side of the protruding portion of the stator cores, and are configured to be resiliently deformable in the circumferential direction in addition to the configuration in Example 4. The protruding portions of the stator cores 21 are brought into press contact with the contact portions 13 deformed in the circumferential direction so as to be positioned on the side of the protruding portions of the stator cores to resiliently deform the contact portions 13, and the protruding portions of the stator cores 21 are fitted between the two contact portions 13.

In Example 5 as well, the same effects as above-described Examples are obtained. According to Example 5, since the protruding portions of the stator cores 21 are fitted between the two contact portions 13 so as to be pressed thereto, the contact properties between the protruding portions of the stator cores 21 and the conductive member 10 is improved in comparison with the configuration of Example 4.

In Example 5, although the contact portions 13 are deformed in the circumferential direction, the contact portions 13 may be configured to be resiliently deformable also in the axial direction by deforming also in the axial direction as illustrated in FIG. 5B.

A modification described in conjunction with Example 1, 3, or 4 (such as earth cable) may be applied to Example 5 in the same manner.

Example 6

Figure 6:
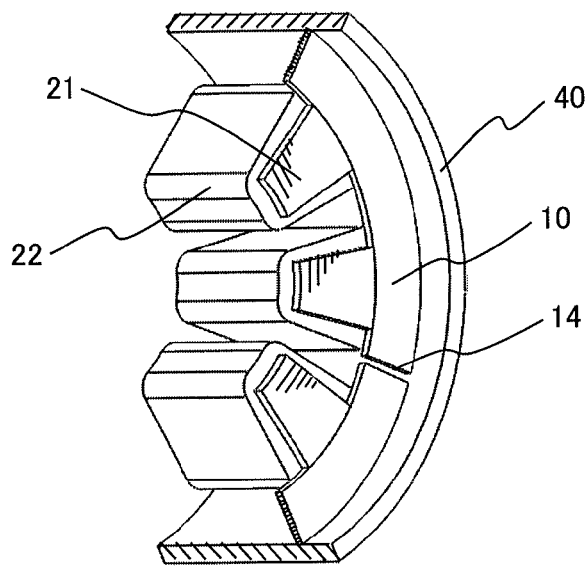
FIG. 6 is a perspective view illustrating a configuration of a stator of the axial gap motor of Example 6 of the invention.

FIG. 6 is a drawing illustrating a structure of a stator of the two-rotor one-stator axial gap motor as Example 6. The same portions as Example 1 are denoted by the same reference numerals, and the description thereof is omitted.

In Example 6, a cutting portion 14 is provided in the conductive member 10 of Example 1, so that the conductive member 10 is divided into a plurality of pieces in the circumferential direction.

In Example 6 as well, the same effect as Example 1 is obtained. In addition, according to Example 6, since the conductive member 10 is divided into a plurality of the pieces in the circumferential direction, an eddy current path generated in the conductive member 10 may be interrupted and hence the loss generated in the conductive member 10 may be reduced in comparison with the configuration of Example 1.

The number of divisions of the conductive member 10 is arbitrary. Also, the configuration described in Example 6 is not limited to Example 1, but also may be used in addition to the configurations described from Example 2 to Example 5.

Example 7

Figure 7:
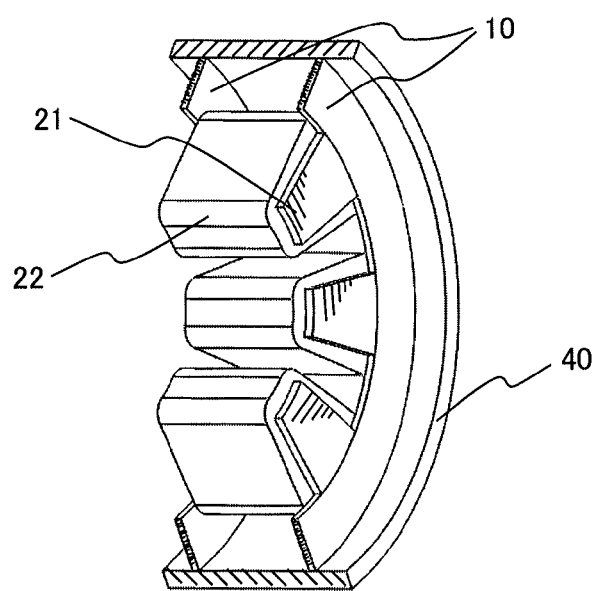
FIG. 7 is a perspective view illustrating a configuration of a stator of the axial gap motor of Example 7 of the invention.

FIG. 7 is a drawing illustrating a structure of a stator of the two-rotor one-stator axial gap motor as Example 7. The same portions as Example 1 are denoted by the same reference numerals, and the description thereof is omitted.

In Example 7, the conductive members 10 in Example 1 are provided on both end surfaces of the stator cores 21 when viewed in the axial direction of the motor.

In Example 7 as well, the same effect as Example 1 is obtained. According to Example 7, since the conductive member 10 comes into contact with outer peripheral surfaces of the protruding portions at both end surfaces of the stator cores 21, the contact properties between the stator cores 21 and the conductive member 10 is improved in comparison with the configuration of Example 1.

In Example 7, since the number of thermal radiating paths between the stator 20 and the housing 40 is increased with the provision of the conductive members 10 on the both end surfaces of the stator cores 21, the temperature rise of the stator 20 may further be restrained in comparison with Example 1.

In addition, in Example 7, since the stator cores 21 may be supported at both ends in the axial direction with the provision of the conductive members 10 on the both end surfaces of the stator cores 21, the positional accuracy of the stator cores 21 in the radial direction is improved.

Also, the configuration described in Example 7 is not limited to Example 1, but also may be used in addition to the configurations described from Example 2 to Example 6.

Example 8

Figure 8:
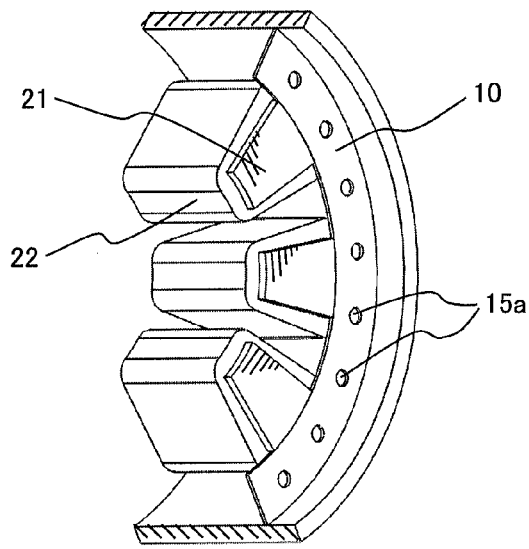
FIG. 8 is a perspective view illustrating a configuration of a stator of the axial gap motor of Example 8 of the invention.

FIG. 8 is a drawing illustrating a structure of a stator of the two-rotor one-stator axial gap motor as Example 8. The same portions as Example 1 are denoted by the same reference numerals, and the description thereof is omitted.

The ring-shaped conductive member 10 of Example 8 is provided with a plurality of through holes 15a in the circumferential direction.

In Example 8 as well, the same effect as Example 1 is obtained. In addition, in Example 8, with the provision of the through holes 15a in the conductive member 10, the through holes 15a serve as filling ports for filling the mold resin 23 or air extracting holes when placing the stator cores and the conductive member in the housing and performing resin molding, and hence the molding properties of the stator 20 may be improved.

The size, the shape, and the number of the through holes 15a are arbitrary. Also, the configuration described in Example 8 is not limited to Example 1, but also may be used in addition to the configurations described from Example 2 to Example 7.

Example 9

Example 9 relates to a two-rotor one-stator axial gap motor provided with an insulating coil bobbin (not illustrated) between the stator cores and the coils.

Figure 9:
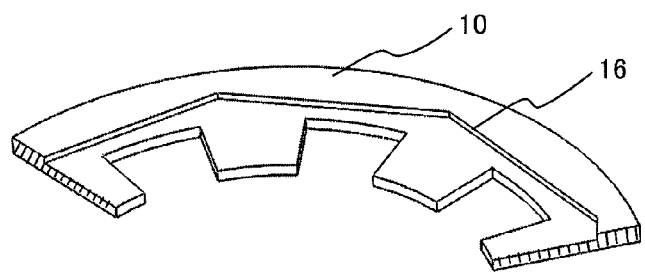
FIG. 9 is a perspective view illustrating a structure of a conductive member of Example 9 of the invention.

FIG. 9 is a drawing illustrating a structure of the conductive member 10 for grounding the stator cores of the two-rotor one-stator axial gap motor as Example 2.

In Example 9, a shoulder portion 16 for positioning the coil bobbin is provided on the side of a surface of the conductive member 10 coming into contact with the coil bobbin (the side of a surface coming into contact with the stator core).

In Example 9 as well, the same effect as above-described Examples is obtained. In addition, according to Example 9, with the provision of the shoulder portion 16 on the conductive member 10, the coil bobbin can be arranged so as to be placed along the shoulder portion 16, so that the positioning of the stator cores 21 in the radial direction and the circumferential direction is achieved via the coil bobbin with high degree of accuracy.

The shape of the shoulder portion 16 is arbitrary and any shape is applicable as long as the positioning of the coil bobbin is achieved.

The configuration described in Example 9 may be added to the configuration of the axial gap motor described in Example 1 to Example 8.

Example 10

Figure 10:
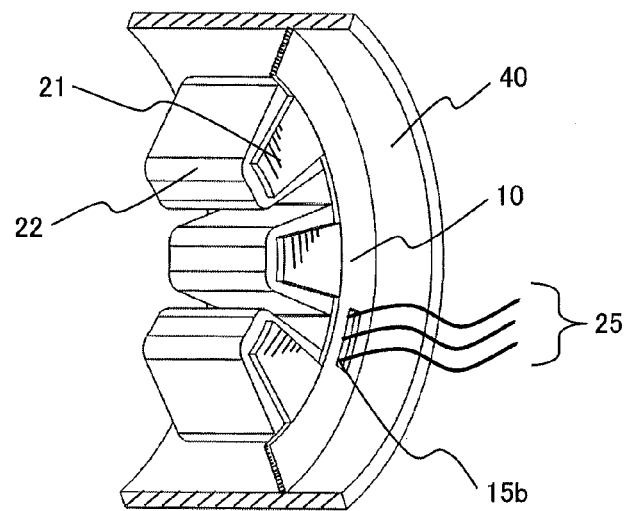
FIG. 10 is a perspective view illustrating a configuration of a stator of the axial gap motor of Example 10 of the invention.

FIG. 10 is a drawing illustrating a structure of a stator of the two-rotor one-stator axial gap motor as Example 10. The same portions as Example 1 are denoted by the same reference numerals, and the description thereof is omitted.

In Example 10, a through hole 15b for taking out a coil wiring 25 (in Example 1 and so forth, illustration of the coil wiring is omitted) is provided in the conductive member 10 of Example 1.

In Example 10 as well, the same effect as above-described Examples is obtained. In addition, according to Example 10, the coil wiring 25 is allowed to be taken out from the through hole 15b provided in the conductive member 10.

The size and the shape of the through holes 15a are arbitrary. Also, the configuration described in Example 10 is not limited to Example 1, but also may be used in addition to the configurations described from Example 2 to Example 9.

Example 11

Figure 11:
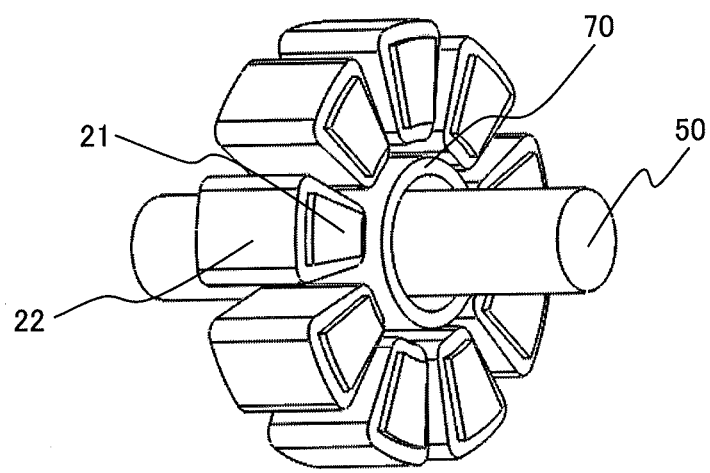
FIG. 11 is a perspective view illustrating a configuration of a stator of the axial gap motor of Example 11 of the invention.

FIG. 11 is a drawing illustrating a structure of a stator of the two-rotor one-stator axial gap motor as Example 11.

In Example 11, a cylindrical conductive member 70 is arranged on the inner peripheral surface of the stator 20. The inner peripheral surface of the stator 20 is the surface facing the rotating shaft 50. Other configurations are applied with the configurations of Examples 1 to 10.

In Example 11, the cylindrical conductive member 70 provided on the inner peripheral surface of the stator 20 causes electrostatic disconnection between the coils 22 and the rotating shaft 50. Therefore, occurrence of the electrical corrosion of the bearing is prevented.

Figure 12:
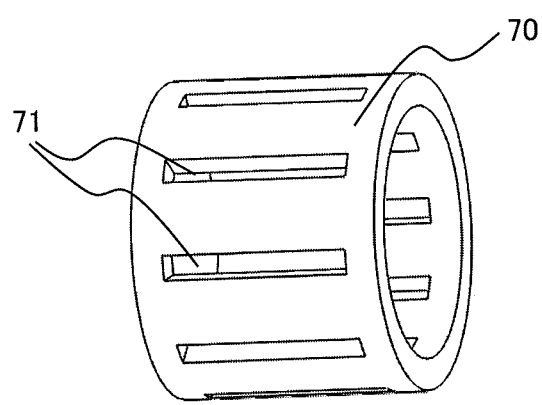
FIG. 12 is a perspective view illustrating another example of a structure of a cylindrical conductive member of Example 11 of the invention.

The cylindrical conductive member 70 may be provided with slits 71 in the circumferential direction of the cylindrical conductive member 70 as illustrated in FIG. 12, for example. The slits 71 provided in the cylindrical conductive member 70 in the circumferential direction interrupt the eddy current path generated in the cylindrical conductive member 70, and hence the loss generated in the cylindrical conductive member 70 may be reduced. The molding properties of the cylindrical conductive member 70 are improved by filling the slits 71 with the mold resin 23 when integrally molding the stator cores 21 and the cylindrical conductive member 70 with the mold resin 23.

FIG. 13 is a drawing illustrating the grounding structure of the cylindrical conductive member 70. The conductive member 10 having the similar structure as Example 2 illustrated in FIG. 2 is used.

In Example 11, the inner peripheral side of the conductive member 10 extends toward the center in comparison with Example 2 so that the inner peripheral side of the conductive member 10 comes into contact with the cylindrical conductive member 70. In Example 11, the side surface of the conductive member 10 on the inner peripheral side is in contact with the end surface of the cylindrical conductive member 70, a configuration in which the inner peripheral surface of the conductive member 10 comes into contact with the outer peripheral surface of the cylindrical conductive member 70 may be employed.

In addition, in the same manner as Example 2, at least one projecting portion 11a extending in the radial direction is provided on the outer peripheral surface (the outer peripheral side) of the conductive member 10. The distal end of the projecting portion 11a comes into contact with the inner peripheral surface of the housing 40.

According to Example 11, since the cylindrical conductive member 70 and the housing 40 are in electrical continuity via the conductive member 10, the cylindrical conductive member 70 is grounded to the housing 40, and hence the cylindrical conductive member 70 is prevented from having the floating potential.

Example 12

Figure 14:
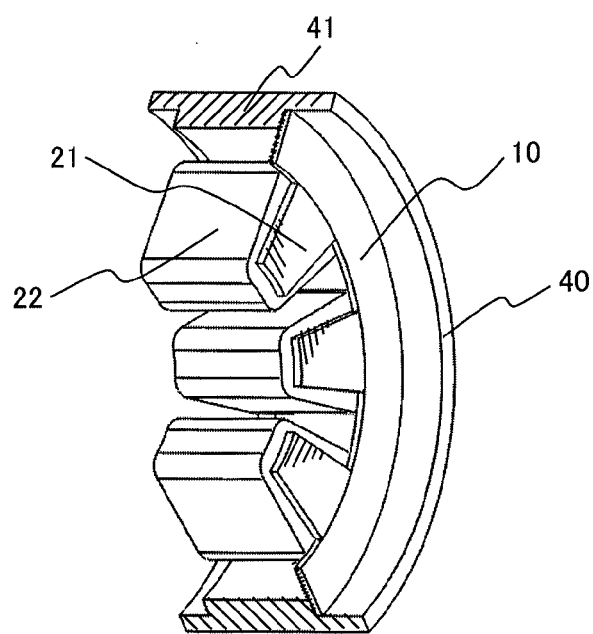
FIG. 14 is a perspective view illustrating a structure of a housing of the axial gap motor of Example 12 of the invention.

FIG. 14 is a drawing illustrating a structure of a stator of the two-rotor one-stator axial gap motor as Example 12. The same portions as Example 1 are denoted by the same reference numerals, and the description thereof is omitted.

In Example 12, a protruding portion 41 is provided on the inner peripheral surface of the housing 40 of Example 1. The conductive member 10 is in contact with the protruding portion 41.

In Example 12 as well, the same effect as Example 1 is obtained. In addition, in Example 12, since the conductive member 10 is arranged so that the side surface thereof comes into contact with the protruding portion 41 provided on the inner peripheral surface of the housing 40, the contact properties between the conductive member 10 and the housing 40 are improved, and the positional accuracy of the conductive member 10 in the axial direction may be improved.

The shape of the protruding portion 41 is arbitrary, and any shape may be employed as long as the contact with at least the conductive member 10 is secured.

Instead of providing the protruding portion 41, a holding member (for example, a screw) may be inserted into and arranged in the interior of the housing from the outside of the housing 40 so that the side surface of the conductive member 10 comes into contact with the holding member.

The invention is not limited to the respective examples described above, and various modifications are included. For example, the respective examples given above are described in detail for easy understanding of the invention and, the invention is not limited to include all the configurations described above. Part of the configuration of a certain example may be replaced by a configuration of another example, or a configuration of a certain example may be added to a configuration of other examples. In addition, part of the configurations of the respective examples may be added with other configurations, eliminated, or replaced with other configurations.

For example, in the example described above, the axial gap motor has been described as the axial gap rotating-electric machine. However, the same may be applied to an axial gap generator.

Although the two-rotor one-stator axial gap rotating-electric machine has been described as the axial gap rotating-electric machine, the same is also applied to the one-rotor one-stator axial gap rotating-electric machine. In this case, in particular, since the conductive member acts as a thermal radiating path between the stator and the housing, a temperature rise of the stator may be restrained.

The invention claimed is:

1. An axial gap rotating-electric machine comprising: a stator, a rotor arranged via an air gap in the direction of an axis of rotation of a rotating-electric machine with respect to the stator, and a housing configured to accommodate the stator and the rotor, wherein
the stator includes a plurality of stator cores arranged in the circumferential direction, coils configured to wind the peripheries of the respective stator cores, and a resin for molding the plurality of stator cores wound with the coils, and the stator cores each include a protruding portion protruding partly from the coil in the direction of axis of rotation, and
a conductive member is provided so as to come into contact with peripheral surfaces of the protruding portions of the stator cores, and grounding is achieved via the conductive member.

2. The axial gap rotating-electric machine according to claim 1, wherein
two of the rotors are provided, and the two of the rotors are arranged so as to sandwich the stator from the direction of the axis of rotation via air gaps therebetween.

3. The axial gap rotating-electric machine according to claim 2, wherein
the housing is formed of a conductive material and
the conductive member is provided so as to come into contact with the inner peripheral surface of the housing.

4. The axial gap rotating-electric machine according to claim 3, wherein
the conductive member is formed into a ring shape,
the inner peripheral surface of the ring-shaped conductive member is in electrical contact with the outer peripheral surfaces of the protruding portions of the stator cores, and
the outer peripheral surface of the ring-shaped conductive member is in electrical contact with the inner peripheral surface of the housing.

5. The axial gap rotating-electric machine according to claim 4, wherein
the ring-shaped conductive member is divided in the circumferential direction.

6. The axial gap rotating-electric machine according to claim 4, wherein
the conductive members are arranged at both end surfaces of the stator.

7. The axial gap rotating-electric machine according to claim 4, wherein
the stator has a bobbin between the stator cores and the coil, and
the conductive member includes a shoulder portion coming into contact with the bobbin on the side of a surface facing the bobbin.

8. The axial gap rotating-electric machine according to claim 3, wherein
the conductive member is formed into a ring shape,
the outer peripheral surface of the ring-shaped conductive member is in electrical contact with the inner peripheral surfaces of the protruding portions of the stator cores, and
a projecting portion extending from the outer peripheral surface of the ring-shaped conductive member is in electrical contact with the inner peripheral surface of the housing.

9. The axial gap rotating-electric machine according to claim 8, wherein
the ring-shaped conductive member is divided in the circumferential direction.

10. The axial gap rotating-electric machine according to claim 8, wherein
the conductive members are arranged at both end surfaces of the stator.

11. The axial gap rotating-electric machine according to claim 8, wherein
the stator has a bobbin between the stator cores and the coil, and
the conductive member includes a shoulder portion coming into contact with the bobbin on the side of a surface facing the bobbin.

12. The axial gap rotating-electric machine according to claim 3, wherein
a projecting portion extending radially from the inner peripheral surface or the outer peripheral surface of the ring-shaped conductive member is formed so that the projecting portion of the conductive member and the side surface of the protruding portion of the stator core may be brought into contact with each other.

13. The axial gap rotating-electric machine according to claim 12, wherein
a plurality of the projecting portions are formed on the ring-shaped conductive member, and the respective projecting portions are each formed with a slit extending in the radial direction, the protruding portions of the stator cores are positioned between the projecting portions, and the protruding portions of the stator cores are sandwiched by the resilient deformation of the projecting portion.

14. The axial gap rotating-electric machine according to claim 3, wherein
a slit extending radially is formed in the ring-shaped conductive member.

15. The axial gap rotating-electric machine according to claim 3, wherein
the stator includes a cylindrical conductive member concentric with the axis of rotation on the inner peripheral side thereof, and
the conductive member electrically connects the cylindrical conductive member and the inner peripheral surface of the housing.

16. The axial gap rotating-electric machine according to claim 15, wherein
the cylindrical conductive member includes a slit.

17. The axial gap rotating-electric machine according to claim 3, wherein
the housing includes a protruding portion on the inner peripheral surface thereof, and
the conductive member is provided so as to come into contact with the protruding portion.

18. The axial gap rotating-electric machine according to claim 1, wherein
the conductive member is formed of a non-magnetic material.

* * * * *